United States Patent
Hansen et al.

(10) Patent No.: US 11,754,055 B2
(45) Date of Patent: Sep. 12, 2023

(54) BEARING ARRANGEMENT OF A WIND TURBINE

(71) Applicant: Siemens Gamesa Renewable Energy A/S, Brande (DK)

(72) Inventors: Mathias Muff Hansen, Esbjerg V (DK); Troels Kildemoes Moeller, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 25 days.

(21) Appl. No.: 17/343,184

(22) Filed: Jun. 9, 2021

(65) Prior Publication Data

US 2021/0396217 A1    Dec. 23, 2021

(30) Foreign Application Priority Data

Jun. 17, 2020   (EP) ..................... 20180471

(51) Int. Cl.
| | | |
|---|---|---|
| *F03D 80/70* | (2016.01) | |
| *F16C 33/72* | (2006.01) | |
| *F16C 33/76* | (2006.01) | |
| *F16C 33/78* | (2006.01) | |

(52) U.S. Cl.
CPC ............ *F03D 80/70* (2016.05); *F16C 33/726* (2013.01); *F16C 33/766* (2013.01); *F16C 33/7856* (2013.01); *F05B 2240/50* (2013.01); *F05B 2260/98* (2013.01); *F16C 2360/31* (2013.01)

(58) Field of Classification Search
CPC .. F16C 33/726; F16C 33/766; F16C 33/7856; F16C 33/7876; F16C 33/7889
See application file for complete search history.

(56) References Cited

U.S. PATENT DOCUMENTS 5,716,147 A * 2/1998 Cook .................... F16C 35/047
                                                              384/492
10,508,740 B2 * 12/2019 Jordan ................... F16J 15/441

FOREIGN PATENT DOCUMENTS

| AU | 2010201247 | * | 8/2011 |
| DE | 102018213228 A1 | | 2/2020 |
| DK | 201500065 | * | 8/2015 |
| EP | 3085978 A1 | | 10/2016 |
| KR | 101021453 B1 | | 3/2011 |

OTHER PUBLICATIONS

Translation of DK201500065, Aug. 2015.*
Extended European Search Report in related Eurpoean Patent Application No. 20180471.3 dated Dec. 3, 2020. 7 pages.

* cited by examiner

*Primary Examiner* — James Pilkington
(74) *Attorney, Agent, or Firm* — Schmeiser, Olsen & Watts LLP

(57) ABSTRACT

Bearing arrangement of a wind turbine, including a bearing with an outer ring and an inner ring and a lubrication fluid provided between both rings, and at least one sealing means arranged at each side of the bearing for sealing the gap between the outer and the inner ring, whereby each sealing means is fixed to one ring and contacts the other ring with a flexible lip-like sealing element, wherein a pressure device for at least temporarily providing a gas overpressure in the sealed gap for increasing the contact load of the lip-like sealing element to the ring is provided.

15 Claims, 4 Drawing Sheets

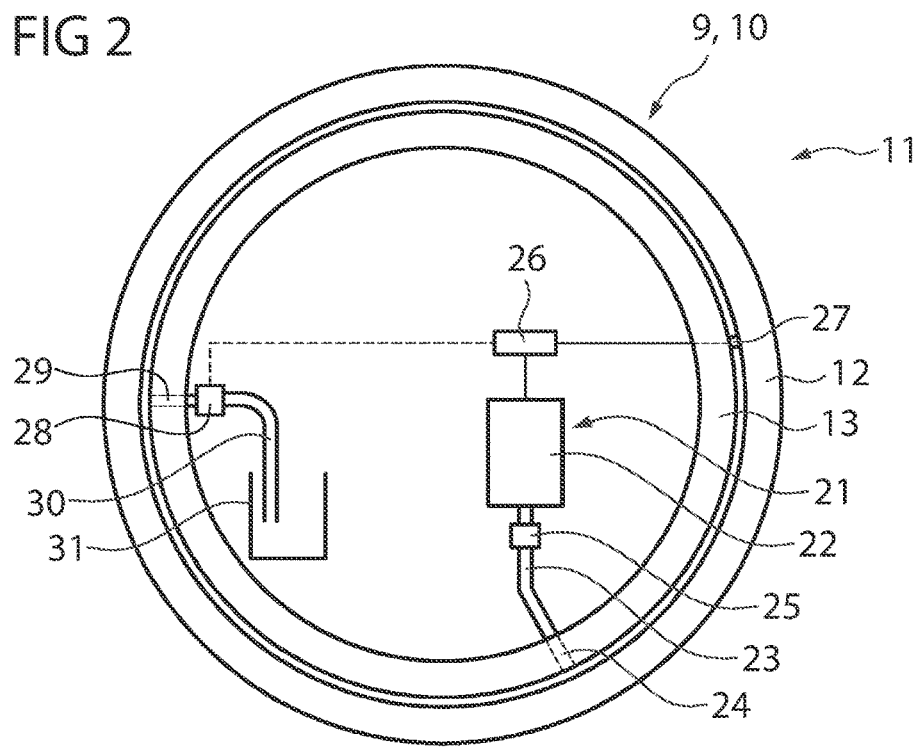
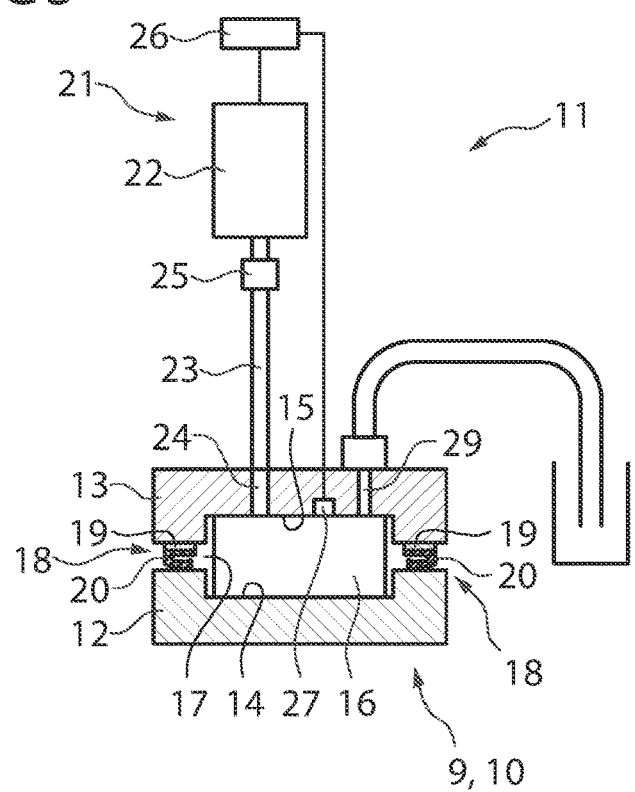

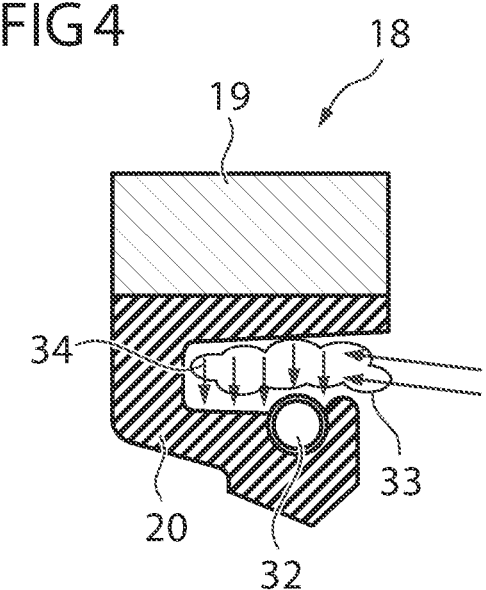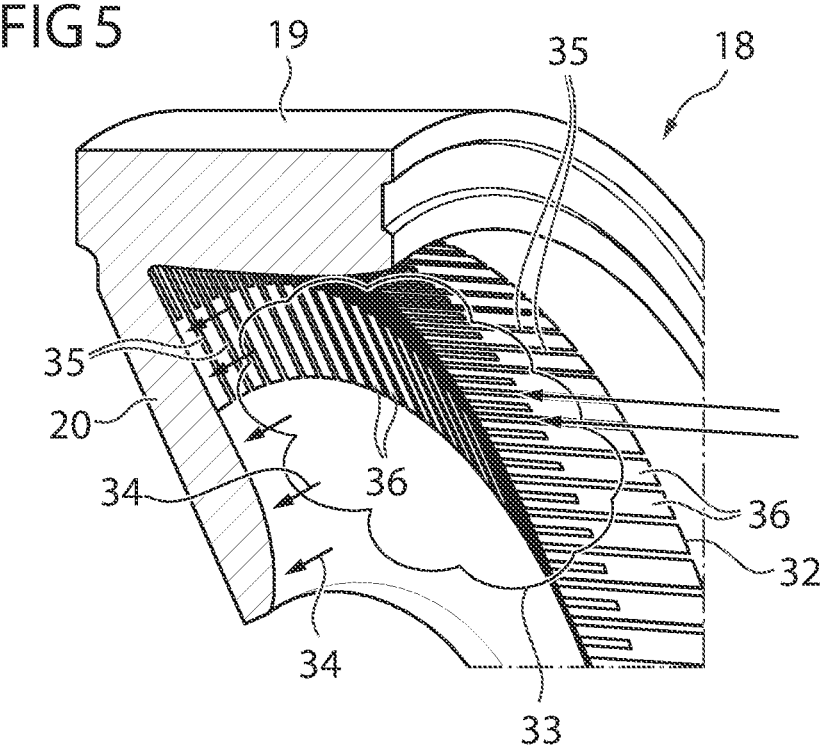

BEARING ARRANGEMENT OF A WIND TURBINE

CROSS-REFERENCE TO RELATED APPLICATIONS

This application claims priority to European Patent Application No. 20180471.3, having a filing date of Jun. 17, 2020, the entire contents of which are hereby incorporated by reference.

FIELD OF TECHNOLOGY

The following refers to a bearing arrangement of a wind turbine, comprising a bearing with an outer ring and an inner ring and a lubrication fluid provided between both rings, and at least one sealing means arranged at each side of the bearing for sealing the gap between the outer and the inner ring, whereby each sealing means is fixed to one ring and contacts the other ring with a flexible lip.

BACKGROUND

A wind turbine, as commonly known, comprises a tower and a nacelle fixed to the top of the tower. A hub, to which several rotor blades are attached, is arranged at the nacelle. The hub rotates, when the turbine blades interact with blowing wind and drives a generator for producing electric power, as commonly known. Such a wind turbine comprises several rotating elements, which are arranged in respective bearings. One example is the main bearing of the generator at a direct drive wind turbine, another example are the blade bearings, by which the rotor blades, which can be changed in their pitch, are attached to the hub.

Each bearing comprises an inner ring and an outer ring and roller elements like tapered rollers or balls rolling on both rings, which are distanced in a radial direction by a gap. In this gap a lubrication fluid like a viscose or liquid grease or fluid is arranged for lubricating the roller elements respectively the raceways of the rings. To avoid leakage of the lubrication fluid from the gap, each bearing is sealed by respective sealing means, which are sealing the gap on both axial sides of the bearing in order to provide a closed, sealed gap for holding back the lubricant. Each sealing means comprises an attachment part, by which it is attached to one ring, for example the non-rotating ring. It further comprises at least one flexible sealing element, which contacts the other ring, for example the rotating ring. These sealing means are usually a ring-shaped rubber seal, which have, as the bearings have diameters of several meters, a respective length of several meters, for example up to ten or more meters.

When the wind turbine is in operation, the bearing is subject to high axial and radial loads, which may significantly vary during operation, when the operation conditions change. These loads will make the bearings subject to deformation, especially between the inner and the outer ring, which may move relative to each other. This deformation movement has a negative influence on the sealing performance, as the gap width and, as the sealing means is fixed to one ring, also the contact of the sealing element to the respective contact surface of the ring may change. As a result, an enhanced leakage occurs due to the unevenness in the contact load of the lip-like sealing elements to the ring.

To address this problem the geometry of the sealing means was adapted to provide a more uniform lip load distribution. Nevertheless some leakage may occur. The problem is also still prominent at bearings, which still have older seal types, which do not have any improved lip geometry. The only option to avoid any excessive leakage is to change the seal to a new seal. This process is very time consuming and expensive and also may increase the risk of introducing contamination into the bearing and thereby increase the risk of pre-major bearing failure due to hard particle indentations.

SUMMARY

An aspect relates to providing an improved bearing arrangement for a wind turbine.

For addressing the problem the present invention proposes a bearing arrangement as mentioned above, which is characterised in that a pressure device for at least temporarily providing a gas overpressure in the sealed gap for increasing the contact load of the sealing element to the ring is provided.

The present invention proposes to constantly or at least temporarily provide a certain gas overpressure in the sealed gap. This gas overpressure acts on a flexible lip portion of a sealing element of both sealing means and therefore increases the contact load of the elements, which are therefore pressed in a stronger contact to the ring compared to the contact load or contact pressure without overpressure. As a result, the sealing performance can be significantly improved, and even when higher loads resulting in higher deformation of the bearing are applied to the bearing, the gap is still sealed due to the improved contact of the sealing element to the ring even if the rings move relative to each other. As a result of the gas overpressure and the increased contact load, the sealing element may follow the deformation and may therefore remain in a sealing contact. This ascertains an improved gap sealing, so that the amount of leakage over the time can significantly be reduced.

Another advantage of the improved bearing arrangement is that also the sealing performance of already installed older sealed types having a more simple lip design may be improved, as due to the gas overpressure also the contact load of these regular respectively non-improved sealing means respectively lip elements may be increased resulting in a better sealing performance.

As mentioned, the present invention proposes to provide a gas overpressure in the sealed gap. This is realised by pressing a gas in the gap, which is a sealed and almost air-tight space, which is sealed radially by both rings and axially by the at least two sealing means. As it is certainly possible to press a specific gas in this sealed gap, which may be free of any moisture or like, i.e. nitrogen, it is to simply use air as a pressure gas. The pressure device is therefore adapted to provide an air overpressure in the sealed gap, so that no specific gas, which needs to be provided in respective gas tanks, is used.

In a further embodiment of the present invention at least one pressure sensor measuring the gas pressure in the gap is provided, which pressure sensor communicates with a control device of the pressure device. The control device controls at least the pressurisation process by controlling the respective pressurisation means, which presses the gas respectively the air in the sealed gap. To monitor the gas pressure in the gap at least one pressure sensor is provided, which measures the gas pressure in the gap. Based on the sensor information the control may then control the respective pressurisation means for increasing the pressure, if necessary, and to control the overpressure to be in a certain pressure interval.

The pressure device may comprise at least one controllable pump communicating with the sealed gap for increasing the gas pressure in the sealed gap. A simple pump, i.e. a compressor is sufficient for providing the gas overpressure, which pump respectively compressor is connected to the gap by a respective pipe. The operation of the pump respectively the compressor is controlled by the respective control device, so that the gas overpressure may be exactly controlled, especially when a pressure sensor for monitoring the gas pressure is provided.

The pump is connected to the sealed gap via a pipe and at least one valve, which valve allows to pump the gas in the gap, but blocks a returning gas flow from the gap to the pump. The valve therefore is a simple non-return valve, which is sufficient to provide the respective gas flow in the gap, but blocks the return flow.

A further embodiment of the present invention proposes that the pressure device comprises at least one pressure relief valve connected to the sealed gap for relieving pressure, when a set maximum pressure is reached. By the pumping action the gas pressure in the gap may be increased. As a safety means a pressure relief valve is provided, which opens and therefore allows to relief the overpressure, when the overpressure reaches or exceeds a maximum pressure. Therefore, when the pressure device respectively the pump increases the overpressure, the overpressure will in fact not exceed a set maximum pressure, as the pressure relief valve will automatically open, when the maximum pressure value is reached. The integration of this pressure relief value is a safety measure, which, for example in combination with the pressure sensor, helps to avoid the pressure rising over a certain maximum value, which would be harmful for the gap sealing.

The pressure relief value may be a mechanical adjustable valve, which allows to adjust the maximum pressure, at which the valve opens. In an alternative the pressure relief valve may also be a controllable electromagnetic valve, which is controlled by the control device controlling the pressure device.

The pressure relief valve is connected to a leakage pipe for piping leaking lubrication fluid to a lubrication fluid collection means when the pressure relief valve opens. When the maximum pressure is reached and the pressure relief valve opens, a certain amount of lubrication fluid will simultaneously exit the gap through the pressure relief valve. To avoid an uncontrolled exit of the lubrication fluid, the pressure relief valve is connected to a leakage pipe, through which the leakage fluid is piped to a leakage fluid collection means. This allows to collect the leakage fluid, even though the fluid amount is small. The collection means may be a simple container, in which the fluid is collected, which container is emptied from time to time.

The overpressure may be held on a constant level over the time. The control device controls the pressure device respectively the pump to hold the overpressure on a certain value respectively in a certain pressure interval. This ensures a constant increased contact load resting on the sealing elements and therefore on the sealing contact to the ring.

In an exemplary embodiment alternative the pressure device is adapted to stepwise raise the gas pressure over the time until a maximum pressure is reached. According to this embodiment no constant gas pressure is provided, but a varying gas pressure, which is increased stepwise respectively by several pressure levels, until it reaches a maximum pressure value respectively level. When this maximum pressure value respectively level is reached, for example the pressure relief valve opens e.g. for a certain time resulting in a controlled reduction of the overpressure to a lower level, so that the stepwise increase of the overpressure in the gap may start again. The time, for which the relief valve opens, may be controlled by the control device in response to a pressure measurement of the pressure sensor. When the sensor measures that a defined lower pressure value is reached, the control device will close the pressure relief valve again and a new cycle starts. Even if such a pressure relief value is not provided, the gas pressure will be decreased over the time, after the maximum pressure value respectively level is reached, as the sealed gap is not completely airtight, resulting in a certain pressure drop over the time. When the pressure is reduced again to a certain pressure value respectively level, a new step-like built-up cycle may start. The advantage of applying a non-constant overpressure and therefore a varying pressure on the sealing lip is a reduction of the wear of the seal, which prolongs the lifetime of the seal.

The purpose of the gas overpressure in the sealed gap is to increase the load resting on the respective sealing element and therefore the contact load or contact force by which the sealing element contacts or presses against the respective ring. To ensure that each sealing element contacts the ring with a certain contact load, even if no overpressure is applied, each sealing means therefore comprises at least one sealing element which is urged by means of one or more spring elements in contact with the ring. Each sealing element, which, as mentioned, is usually is made of an elastic polymer respectively rubber or the like, comprises at least one spring element, which urges the sealing lip in contact with the ring. This spring element may be a separate spring element, which is attached to the sealing means. In an alternative the spring element may also be incorporated respectively embedded in the sealing means.

In a first embodiment the spring element may be a circular spring, especially a Garter spring extending around the circumference of the element. The spring element in this embodiment is a separate element, which is attached to the sealing. As already mentioned, the length of the circular sealing means is remarkable, it may have a length, due to the diameter of the bearing, of several meters, even up to ten meters or more. Therefore also the spring element respectively the Garter spring is very long. It has shown that the longer the sealing means respectively the spring element or the Garter spring, the lower is the pressure exerted by the spring element on the sealing lip, while the local pressure also is somehow not uniform seen along the circumference. Therefore the spring element provides a certain basic load, which is increased by the overpressure provided by the pressure device.

In an alternative to the separate circular spring element respectively the Garter spring, the respective sealing means may also comprise a circular spring element having several longitudinal spring bars extending axially along the sealing element. In this embodiment, where the sealing element is integrated respectively embedded in the material respectively the matrix of the sealing means material, the spring element comprises a larger number of longitudinal spring bars, which extend axially along the sealing element. These spring bars may be realised by respective slits provided at the spring element. The high number of spring bars provide a higher basic load, which is, as each spring bar is a separate small spring, evenly distributed around the circumference. Also, in this embodiment the basic contact load provided by the spring element is remarkably increased by the overpressure realised in the sealed gap according to the present invention.

Apart from the inventive bearing arrangement the present invention also refers to a wind turbine, which comprises at least one bearing arrangement as mentioned above. This bearing arrangement may be the main bearing respectively comprise the main bearing of a direct drive wind turbine or may be or comprise the respective blade bearings. The enumeration of the respective bearing, which may be part of the bearing arrangement, is not final, as also other bearings, which show leakage problems in operation, may be part of the bearing arrangement of the wind turbine.

Finally the present invention refers to a method for reducing the amount of leakage fluid leaking from a bearing of a wind turbine, the bearing comprising an outer ring and an inner ring and a lubrication fluid provided between both rings, with the gap between both rings being sealed by at least two sealing means, whereby each sealing means is fixed to one ring and contacts the other ring with a flexible portion of the sealing element. This method is characterised in that a gas overpressure is at least temporarily applied in the sealed gap by a pressure device for increasing the contact load of the sealing element to the ring.

The pressure may be constantly increased, so that a constant overpressure value or level is maintained. In an alternative the pressure may be raised stepwise over the time until a maximum pressure is reached. This maximum pressure may then be reduced again automatically for example by a pressure relief valve, which opens when the maximum pressure is reached, so that a new stepwise pressurisation cycle may start. In an alternative the high pressure may also be reduced over the time due to some air leakage from the sealed gap, which is not completely air-tight.

For providing the gas overpressure, which is an air overpressure, a pump may be used, which is controlled by a control device. This control device may communicate with the pressure sensor measuring the gas pressure in the gap, so that the pump may be controlled based on the sensor information.

As already mentioned, a pressure relief valve may open, when a maximum pressure in the sealed gap is reached. When the valve opens, a small amount of lubrication fluid will leak through the valve from the gap. The leakage fluid is collected in a lubrication fluid collection means, to which it is guided through a pipe, which is attached to respectively into which the respective pressure relief valve is integrated.

BRIEF DESCRIPTION

Some of the embodiments will be described in detail, with reference to the following figures, wherein like designations denote like members, wherein:

FIG. 2 depicts a principle illustration of an inventive bearing arrangement in a front view;

FIG. 3 depicts a principle illustration of the bearing arrangement of FIG. 2 in a cross-section through a part of the bearing;

FIG. 4 depicts a principle illustration of a cross-section of a sealing means of a first type;

FIG. 5 depicts a principle illustration, in a perspective view, of a sealing means of a second type.

DETAILED DESCRIPTION

Figure 1:
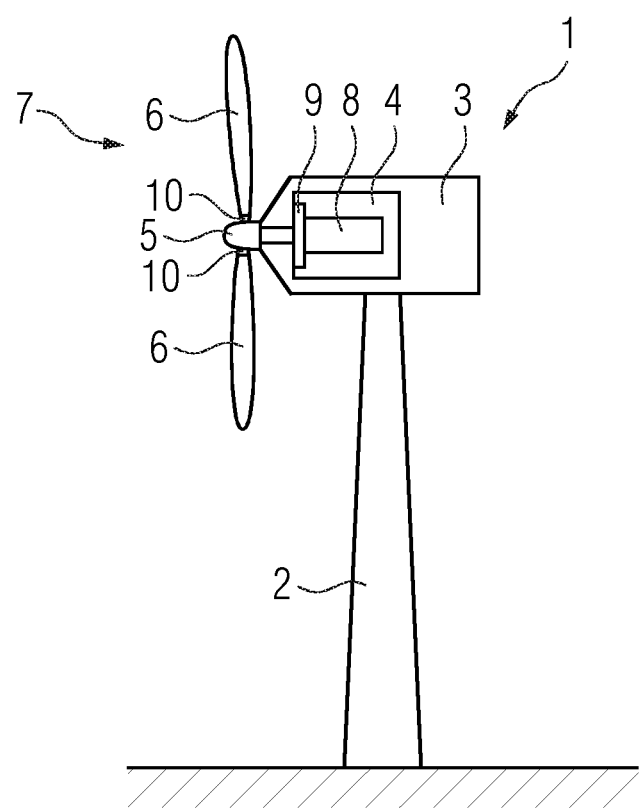
FIG. 1 depicts a principle illustration of an inventive wind turbine.

FIG. 1 shows a wind turbine 1, comprising a tower 2 in a nacelle 3 attached to the top of the tower 2. The nacelle comprises a generator 4, which is connected to a hub 5, to which respective rotor blades 6 are attached. As commonly known, the rotor 7 comprising the hub 5 and the rotor blade 6 rotates in operation and drives the rotor 8 of the generator 4. This rotative arrangement respectively the rotor 8 is attached to a bearing 9, e.g. a main bearing in a direct drive wind turbine.

Another rotating component is each rotor blade 6, which can be rotated relative to the hub for changing the pitch. Also, each rotor blade 6 is attached to a bearing 10 allowing this rotation.

FIG. 1 is only a simple principle illustration showing that there are several large bearing 9, 10 at the wind turbine 1, which bear respective large devices, and which can be part of an inventive bearing arrangement, which is disclosed in detail below. The shown bearings 9, 10 are only for illustration purpose. Certainly also other larger bearings of the wind turbine 1 may be part of such a bearing arrangement.

As commonly known, each bearing 9, 10 comprises an inner ring and an outer ring. One ring is stationary, while the other ring is fixed to the rotating component. Both rings have raceways, on which respective roller elements like rollers, tapered rollers, balls etc. roll. As a lubrication is necessary, a lubrication fluid like a sufficiently viscous grease or oil is provided in the gap between both rings, where the roller elements and raceways are. The gap is sealed to both axial sides by a respective sealing means in order to retain the lubrication fluid in the gap.

In operation, when the rotor 7 rotates and drives the rotor 8 of the generator 4, high axial and radial loads rest on each respective bearing 9, 10. These loads may vary over the time due to changing operation conditions like changes in the wind direction, in the strength of the blowing wind etc. The loads cause some deformation of the respective bearing 9, 10, especially regarding the position of the rings relative to each other. They may shift relative to each other especially in radial direction leading to a change of the gap geometry respectively the local gap width. This may lead to sealing problems and to an enhanced leakage rate of the lubrication fluid.

To address this problem the present invention proposes a bearing arrangement 11, a principle example of which is shown in FIGS. 2 and 3. FIG. 2 shows a front view of one of the bearings 9, 10, while FIG. 3 shows a principle cross-section of the bearing 9, 10.

The bearing 9, 10 comprises an outer ring 12 and an inner ring 13. Each ring has a raceway 14, 15, on which respective roller elements 16, here for example cylindrical rollers, roll. Therefore between both rings 12, 13 a gap 17 is realised, which is sealed on both axial ends by respective sealing means 18, which for example are fixed to the stationary inner ring 13 and seal by contact to the outer ring 12. Each sealing means 18 comprises a fixation part 19, by which it is fixed to the inner ring 13, and a sealing element 20 having a flexible lip portion, which contacts with a certain contact load to the outer ring 12.

As the geometry of the gap 17 may vary due to the high, changing loads, this sealing contact may be negatively influenced. To address this problem the inventive bearing arrangement comprises a pressure device 21 comprising a pump 22, i.e. a compressor, which is connected by a pipe 23 to a radial inlet bore 24 provided in the inner ring 13 and open to the gap 17. A valve 25 is provided, which is a simple non-return valve allowing the flow of compressed air from the pump 22 through the pipe 23 to the gap 17, and which blocks the return flow, so that an overpressure may be built up or maintained in the sealed gap 17.

A control device 26 is provided for controlling the operation of the pump 22. The control device 26 communicates with the pressure sensor 27 which is used for, constantly, measuring the gas respectively air pressure in the gap 17, so that the operation of the pump 22 may be controlled based on the sensor information.

The pressure device 21 further comprises a pressure relief valve 28, which is connected to a radial bore 29 in the inner ring 13, which bore is also open to the gap 17. This pressure relief valve 28 may be an adjustable mechanical valve, which can be adjusted in regard of the air pressure acting on it for opening the pressure relief valve 28, so that a certain maximum overpressure value may be adjusted, which is the pressure value for opening the pressure relief valve 28. It may also be an electromagnetic valve, which can be controlled by the control device 26. As this is only an option, a respective control line is dashed in FIG. 2.

The function of this pressure relief valve 28 is to open, when a certain overpressure value or level is reached in order to avoid an unwanted rise of the overpressure to amounts which may be harmful for the sealing means 18. The pressure relief value 28 therefore is a safety device.

As, when the pressure relief valve 28 opens, the gap 17 is open, a certain, even though small amount of lubrication fluid will, together with the gas or air, also escape from the gap 17. For collecting this leakage fluid, a leakage pipe 30 is connected to the pressure relief valve 28, which pipes the leakage fluid to a leakage fluid collection means 31 like a container or the like.

In operation of the wind turbine 1 a certain distinct overpressure can be built up in the sealed gap 17 by controlling the pump 22. This overpressure increases the contact load respectively the contact force by which the respective sealing element 20 contacts or presses against the ring 12. This enhanced sealing or contact pressure ensures also a tight sealing of the gap 17 even when high loads or high varying loads are applied to the respective bearing 9, 10 resulting in the above mentioned deformation of shifting of the rings 12, 13 relative to each other, changing the geometry of the gap 17. This deformation can be compensated, as due to the increased pressure respectively contact force the elements 20 are still in contact with the ring 12, so that the tight sealing is maintained.

FIGS. 4 and 5 show two embodiments of sealing means 18, which may be used. FIG. 4 shows a sealing means, made of an elastic polymer, having a usual design, comprising the fixation part 19, to which the sealing element 20 is attached. A spring element 32, like a Garter spring, which extends around the complete circumference of the seal element 20, forces the sealing element 20 radially in sealing contact to the respective ring. The circumference of the sealing element 20 is large, it may amount to ten or more meters. Therefore, also the circular spring element 32 is very long, resulting in a reduced spring force respectively an uneven forced distribution around the circumference. This may lead to the abovementioned problems.

But when, according to the present invention, the gas or air overpressure is provided within the gap 17, the radial force, which presses the sealing element 20 against the ring 12, is increased. The overpressure is shown by the cloud symbol 33 and the arrows 34 showing the radial overpressure force acting on the radial lip sealing element 20. It is obvious that due to this overpressure 33, and in combination with the spring element 32, the radial sealing force or contact load is increased, so that any deformation may be compensated.

FIG. 5 shows a sealing means 18 of a second type. It again has a fixation part 19 and a sealing element 20, which extends radially from the fixation part 19. Again, a spring element 32 is provided, which is embedded in the elastic material the sealing means 12 is made of, for example an elastic polymer etc. The spring element 32, which, like the spring element 32 respectively the Garter spring of FIG. 4, is a metal element, is provided with many slits 35 extending in the axial and radial direction, so that a large number of respective longitudinal spring bars 36 are provided, which act as separate springs for providing a basic contact load.

This contact load is again increased by providing the gas or air overpressure as symbolised by the cloud symbol 33, so that, as shown by the arrows 34, the sealing element 20 is urged in contact with the ring with an increased load or force.

Figure 6:
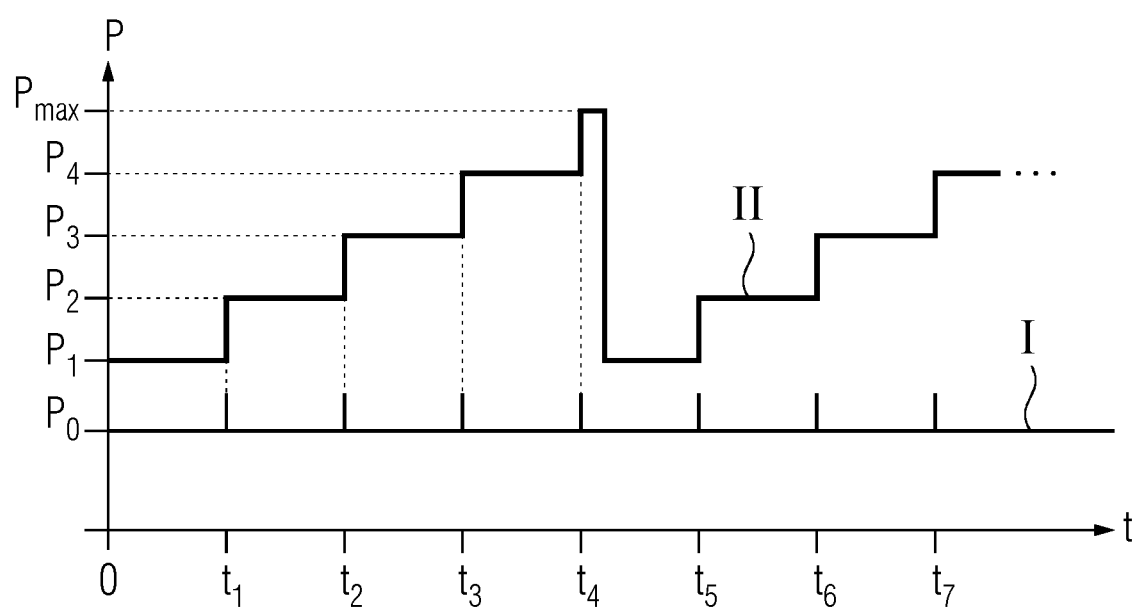
FIG. 6 depicts a diagram showing the operation of the pump in a first curve and the pressure in the gap as a second curve over the time.

FIG. 6 shows an operation example in form of a diagram with the time shown on the horizontal axis and the operation of the pump 22 and the respective pressure levels shown along the vertical axis.

The curve I shows the operation of the pump 22. As shown, the pump is most of the time not operating. Only at the distinct times $t_1, t_2, \ldots, t_6, t_7$ the pump is started for a short time, for example 5-10 seconds, with a time gap between each time $t_1$-$t_2$, $t_2$-$t_3$, etc. of for example 30 minutes. This short time of operation is sufficient to raise the overpressure in the gap 17 from one level to another.

The respective overpressure is shown by the curve II. In FIG. 6 in the first time slot between 0-$t_1$ the pressure in the gap 17 is on a first level $P_1$. At the time $t_1$ the pump 22 is in operation for some seconds raising the pressure to the second level $P_2$ as shown in curve II. This level is maintained during the next period between $t_1$-$t_2$. At $t_2$ the pump is again started raising the pressure to the third level $P_3$, which is maintained until the time $t_3$, when the pump again is started raising the overpressure to the level $P_4$. The level $P_4$ is already close to the maximum overpressure $P_{max}$, which may be present in the gap 17, and which is adjusted in regard of the pressure relief valve 28, which will open when this maximum pressure level is reached. This is the case at the time $t_4$, when the pump 22 is again started raising the overpressure to or above the maximum pressure $P_{max}$. This will automatically open the pressure relief valve 28 either due to its mechanical adjustment or based on a control by the control device 26, so that the overpressure relieved. As the curve II clearly shows, the pressure drops again for example to the level $P_1$. From now on a new cycle starts, where the pressure again is increased stepwise by the short operation of the pump 22 at the respective times $t_5, t_6, t_7 \ldots$, until the maximum pressure $P_{max}$ is reached again and the pressure drops again as the pressure relief valve 28 opens again. Either the pressure relief valve 28 opens automatically, in case it is a mechanical valve, or it opens by control of the control device 26, in case it is a controllable electromagnetic valve.

The control of the pump 22 may also be based on the measured pressure values delivered from the pressure sensor 27. The control device 26 may control the operation of the pump 22 to raise the pressure, until the respective pressure level $P_2$, $P_3$, $P_4$ is reached and will immediately stop the pump 22, when the pressure sensor 27 measures the respective pressure value.

In an alternative the pressure may also be maintained on a constant higher level, which is somewhere below the maximum pressure $P_{max}$, without a stepwise change. The pressure is constantly monitored by the pressure sensor 27 as a control basis for the control device 26 controlling the pump 22, which is started as soon as a pressure drop to a certain mower pressure value is measured to immediately raise the pressure again to the higher level. This allows to maintain the pressure constantly in a set pressure interval. Nevertheless, the pressure relief valve 28 as a safety device will open in any case the pressure exceed the maximum pressure $P_{max}$.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A bearing arrangement of a wind turbine, comprising:
   a bearing with an outer ring and an inner ring and a lubrication fluid provided between the outer ring and the inner ring;
   at least one sealing means arranged at each side of the bearing for sealing a gap between the outer ring and the inner ring, wherein each of the at least one sealing means is fixed to one ring and contacts the other ring with a flexible lip portion; and
   a pressure device for at least temporarily providing a gas overpressure in the gap by supplying a gas between each side of the bearing for increasing a contact load of the flexible lip portion on each side of the bearing to the outer ring;
   wherein the pressure device comprises at least one pressure relief valve connected to the gap for relieving pressure, when a set maximum pressure is reached.

2. The bearing arrangement according to claim 1, wherein the pressure device is configured to provide an air overpressure in the gap.

3. The bearing arrangement according to claim 1, further comprising at least one pressure sensor measuring a gas pressure in the gap, the at least one pressure sensor communicates with a control device of the pressure device.

4. The bearing arrangement according to claim 3, wherein the control device is configured for cyclically controlling a pump to stepwise raise the gas pressure.

5. The bearing arrangement according to claim 1, wherein the pressure device comprises at least one controllable pump communicating with the gap for increasing a gas pressure in the gap.

6. The bearing according to claim 5, wherein the pump is connected to the sealed gap via a pipe and at least one valve.

7. The bearing arrangement according to claim 1, wherein the at least one pressure relief valve is connected to a leakage pipe for piping leaking lubrication fluid to a lubrication fluid collection means when the at least one pressure relief valve opens.

8. The bearing arrangement according to claim 1, wherein the pressure device is a pump configured to stepwise raise a gas pressure over time until a maximum pressure is reached.

9. The bearing arrangement according to claim 1, wherein each of the at least one sealing means comprises a lip seal which is urged by means of one or more spring elements in contact with the outer ring.

10. A wind turbine, comprising at least one bearing arrangement according to claim 1.

11. A bearing arrangement of a wind turbine, comprising:
    a bearing with an outer ring and an inner ring and a lubrication fluid provided between the outer ring and the inner ring;
    at least one sealing means arranged at each side of the bearing for sealing a gap between the outer ring and the inner ring, wherein each of the at least one sealing means is fixed to one ring and contacts the other ring with a flexible lip portion; and
    a pressure device for at least temporarily providing a gas overpressure in the gap by supplying a gas between each side of the bearing for increasing a contact load of the flexible lip portion on each side of the bearing to the outer ring;
    wherein each of the at least one sealing means comprises a lip seal which is urged by means of one or more spring elements in contact with the outer ring.

12. A method for reducing an amount of leakage fluid leaking from a bearing of a wind turbine, the bearing comprising an outer ring and an inner ring and a lubrication fluid provided between both the outer ring and the inner ring, with a gap between both rings being sealed by at least two sealing means located at opposite sides of the bearing, whereby each of the at least two sealing means are fixed to one ring and contacts the other ring with a flexible lip, the method comprising:
    applying a gas overpressure in the gap at least temporarily by a pressure device that supplies a gas between each side of the bearing for increasing a contact load of the flexible lip to the outer ring at both axial ends of the bearing, wherein the pressure device comprises at least one pressure relief valve connected to the gap for relieving pressure, when a set maximum pressure is reached.

13. The method according to claim 12, wherein a pressure is constantly increased, or that the pressure is stepwise raised over time until a maximum pressure is reached.

14. The method according to claim 12, wherein a pump controlled by a control device is used for providing the gas overpressure.

15. The method according to claim 12, wherein the at least one pressure relief valve opens, when a maximum pressure in the gap is reached, and that any lubrication fluid leaking from the gap due to an opening of the pressure relief valve is collected in a lubrication fluid collection means.

* * * * *